United States Patent Office 2,796,658
Patented June 25, 1957

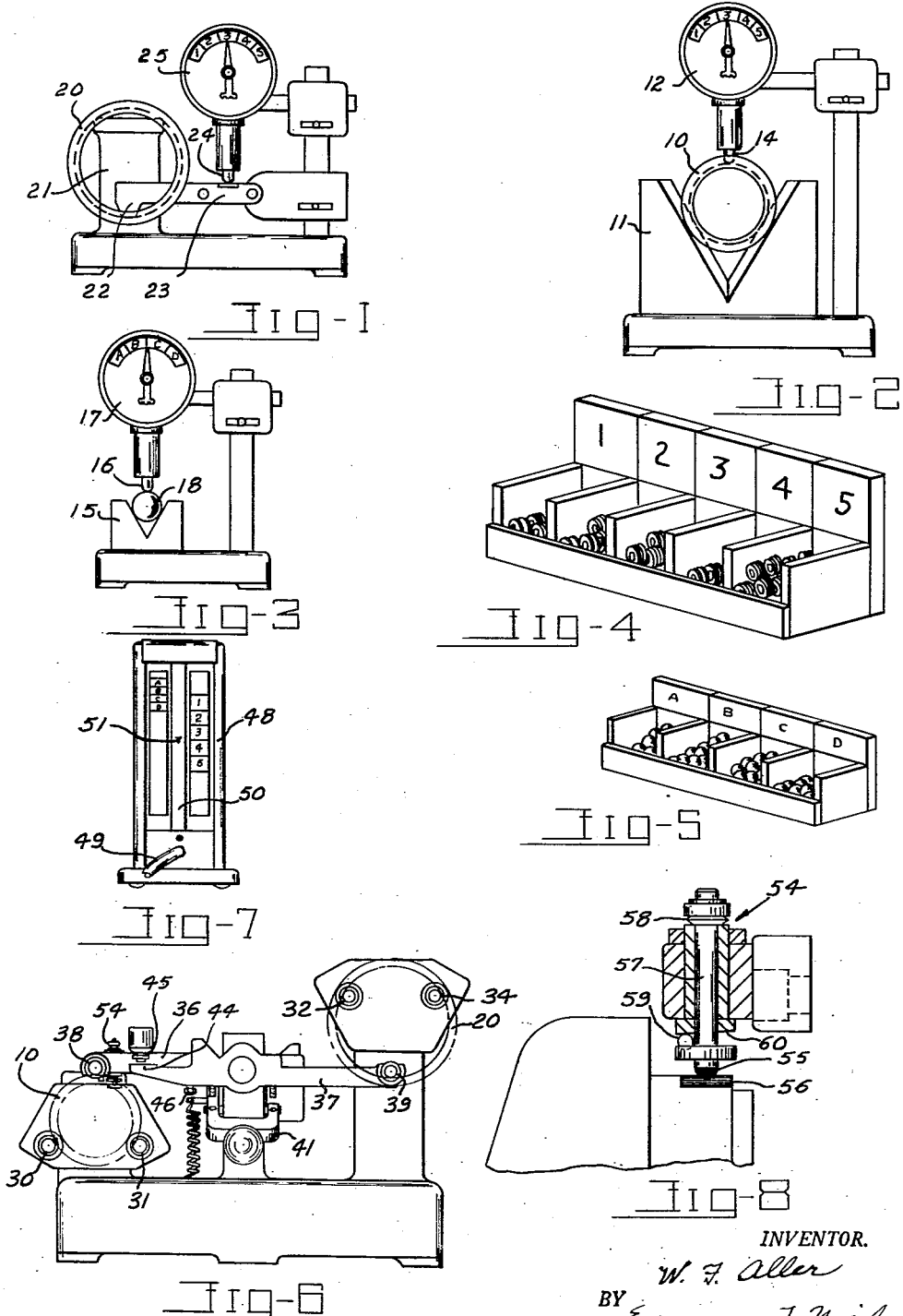

2,796,658

METHOD OF GAUGING AND SELECTING COOPERATING PARTS

Willis Fay Aller, Dayton, Ohio, assignor, by mesne assignments, to The Sheffield Corporation, a corporation of Delaware Application November 2, 1953, Serial No. 389,734

9 Claims. (Cl. 29—148.4)

This invention relates to a method of manufacture, gauging and selective assembly for cooperating precision parts.

The broader the tolerance which can be allowed in the dimension of a particular part the more rapidly and cheaply that part can be made. In many assembled units, of which precision ball bearings are a good example, the operating conditions have required critical operating tolerances. Such conditions have previously been reflected in the manufacture of unit parts to extremely close tolerances and a complex selective and assembly procedure involving the classification of unit parts into a very large number of narrow size classifications. For example, in one method used in the manufacture and assembly of precision ball bearings the balls have been manufactured to an extremely close tolerance and the races of the bearing rings gauged independently and classified and segregated into a great number of segregated groups each including races having dimensions within a narrow size range. Without further gauging a selective assembly procedure is followed.

It is an object of this invention to simplify selective gauging and assembly operations of the nature referred to above, to materially reduce the number of part size classifications involved and to allow the broadening of manufacturing tolerances and classification ranges.

It is a further object to provide a method of gauging and assembly for units involving several cooperating parts wherein a gauging operation precedes each selection of a unit part for assembly so that units can be assembled with assurance that they will have the desired operating tolerances.

It is a further object to provide a method of gauging and assembly for units comprising cooperating precision parts wherein through a unique relationship of a few part classifications and a novel gauging procedure units can be readily provided having the proper operating tolerances in a gauging and assembly operation which is rapidly and economically carried out.

It is a further object to provide a method of gauging and assembly wherein a part is taken at random and is gauged, another part is selected from one of a few part classifications as determined by the gauging of the random taken part, those parts then being gauged together to determine their dimensional relationship so that still another part can be selected for assembly therewith from classifications provided to accommodate the variation possible within a classification of the first selected part to provide an assembly having the proper operating tolerances.

Other objects and advantages of the invention will be apparent from the following description, the appended claims, and the accompanying drawing, in which, Figures 1, 2 and 3 respectively illustrate basically simple devices for gauging the diameter of an outer race, the diameter of an inner race, and a ball diameter, Figures 4 and 5 show bins containing classified bearing inner bearing rings and balls respectively, Figure 6 illustrates an exemplary gauging apparatus for performing dimensional comparisons between inner and outer bearing races, Figure 7 illustrates a specially calibrated flow measuring instrument for utilization with the apparatus of Figure 6 in performing the present method, and Figure 8 shows in cross section an adjustable stop means for the aforementioned apparatus.

The method of this invention in one of its forms has been illustrated and will be described as applied to the assembly of ball bearing parts or components. However, it will be understood that it is not restricted to that application but has utility wherever precision parts must be manufactured and assembled to close operating tolerances.

With the present method one component of an assembly is manufactured within a fairly wide tolerance range and is not classified. Other components, two in number in the case of a ball bearing as shown, are also manufactured within tolerances which can be easily maintained and these two components are gauged and classified into a relatively few selections; the selections being so related as to obtain an effective multiplying of classifications and providing a simple gauging and assembly procedure.

In carrying out the present invention in mass production operation groups of each of the bearing components are manufactured. When, for example, the outer ring is the component to be selected at random the races of the inner rings and the balls will be gauged and the inner rings and balls classified and preferably segregated into several steps or ranges according to different size range classifications within the tolerance limits of each of these components. The outer race is gauged to determine from which of the inner ring race classifications an inner ring should be selected having a race most closely satisfying the desired relationship between these components. The dimensional relationship between these two components can therefore vary from that desired relationship by no more than the range of one inner race classification. The random outer race and selected inner race are then gauged together to determine where within this narrow possible variation their dimensional relationship lies. Balls are then selected from that classified group which will properly assemble with these races, compensating for the variation possible and giving the desired operating tolerances. Thus by gauging the outer race an inner ring is selected having a race which will have a relationship thereto close to that desired and then by gauging the inner and outer races together balls can be selected to further refine this relationship and get an assembled bearing meeting the desired tolerances. Because any one of the several ball classifications can be used with any one of the inner race classifications an effective multiplying of classifications is achieved. Thus with this procedure and classification relationship with a few classifications of only two of the bearing components a proper assembled bearing is achieved without involving extremely close tolerances on any one component or a complex operation involving high numbers of classifications. Bearings can be assembled with assurance that they will be within operating tolerances and no costly tear-down and reassembly operations are required.

Only a few classifications are necessary, for example, three classifications of the inner bearing rings and two ball size classifications will provide twelve different possible combinations for assembly with a random taken outer ring. If a more accurate control of the final assembly clearances are necessary then perhaps six or seven inner ring classifications and several additional ball classifications could be provided without narrowing the manufacturing tolerances of any one part.

One method of carrying out the present invention will now be described as it would be carried out if utilizing the illustrated devices. However, it should be understood that the illustrated devices are only used in an illustrative application of this invention and that this invention can be carried out by other materially different devices.

In this exemplary application of the method it is the outer ball bearing ring which is selected at random from within outer rings having races within the tolerance limits of this bearing component. The inner rings and balls are marked or segregated into classifications within the tolerance limits of the inner ring race and ball diameters. The instruments illustrated are calibrated for five selections of inner races numbered 1 to 5. The balls are classified into four steps and these steps are indicated by the letters A to D.

The apparatus of Figure 2 is adapted for classifying the inner bearing rings in accordance with their race diameters. A ring 10 is supported in gauging position on its race at two points by a V-block arrangement 11. The dial indicator 12 has a contactor 14 which engages the race at a point substantially equidistant from the two contact points of the V-block 11. The dial indicator 12 is calibrated for segregating the inner rings into race size classifications. A bin such as that illustrated in Figure 4 is provided to receive these rings following their gauging with the apparatus of Figure 2. Inner rings having races falling anywhere within the size ranges of each of the classifications 1 to 5 are placed in the respective compartments 1 to 5 of the bin of Figure 4.

The balls are classified by the apparatus of Figure 3 and are supported by the V-block arrangement 15 for gauging. The contactor 16 of the dial indicator 17 engages these balls and is positioned in accordance with the ball diameters. As shown in that figure, the dial indicator 17 is calibrated to segregate and classify the balls into four size ranges lettered A to D. After being classified with the gauging apparatus of Figure 3 they are placed in the corresponding compartments of the bin illustrated in Figure 5.

The race of an outer ring is gauged as shown in Figure 1 in order to determine from which of the inner ring race classifications 1 to 5 an inner ring should be selected for matching therewith. In the apparatus of Figure 1 the outer ring race 20 is supported at two points upon a pedestal 21. A contact 22 carried by a pivotably mounted arm 23 engages the race at a point substantially equidistant from these two support contact points. A contactor 24 of a dial indicator 25 is controlled by the positioning of the contact 22 in accordance with the diameter of the outer race. To avoid mental computations and simplify the operation the dial indicator 25 is calibrated in terms of inner ring race classifications. Thus if the pointer of the indicator 25 falls within the range of classification 1 as appears thereon it indicates that the size of the outer race 20 being gauged is such as to call for an inner ring from classification 1 as these inner rings are segregated to the compartments of the bin of Figure 4.

After the race diameter of the random taken outer ring has been gauged and it has been determined from which classification an inner ring should be selected, the random outer ring race and the selected inner ring race are directly gauged one against the other and their dimensional relationship determined by the gauging apparatus of Figure 6. The inner ring is supported for gauging at the left of the apparatus with its race contacting two fixed contacts 30 and 31. The outer ring is supported to the right of the apparatus by hanging upon two contacts 32 and 34. Gauging arms 36 and 37 pivoted about a common axis carry race contacts 38 and 39 which are respectively positioned in accordance with the diameters of the inner and outer races. A lever mechanism 41 is provided to raise the gauging arms 36 and 37 out of gauging position. The gauging arm 37 carries an orifice in its lefthand end at 44 and positions this orifice in accordance with the outer race diameter. The gauging arm 36 carries an orifice controlling surface 45 in opposing relationship to the orifice 44 and positions it in accordance with the inner ring race diameter. It will be readily seen that the orifice 44 and orifice controlling surface 45 are relatively positioned in accordance with the dimensional relationship between the inner and outer ring races being gauged. The apparatus of Figure 6 is adapted for connection at 46 to a flow measuring instrument and a source of fluid pressure.

A commercially available flow measuring instrument 48 having calibrations thereon for carrying out the present invention is illustrated in Figure 7. It is connected to the apparatus of Figure 6 by a tube 49 leading to the connection 46 of the orifice 44. It comprises essentially a vertically disposed transparent tube having an internal taper 50 along which a float 51 positions itself in accordance with the velocity of fluid flow through the tube and orifice as controlled by the relative proximity of the orifice controlling surface 45 and the orifice 44 of the apparatus of Figure 6. Thus the float will position itself in accordance with the relative positions of the gauge contact carrying arms 36 and 37. As herein shown the instrument 48 has calibration ranges A to D along the lefthand side of the tube 50. When the random selected outer ring 20 and the selected inner ring 10 are placed on the gauge and the contacts 38 and 39 are lowered into engagement with their races the float 51 will position itself along the calibrations A to D to indicate which of the previously classified ball selections should be selected for assembly.

Thus what is actually carried out is that an outer race is taken at random and is gauged to determine which of several inner race classifications 1 to 5 an inner race should be selected for assembly therewith. The only variation from a desired relationship which can remain in such a combination is that within the range of one inner race classification. Following this the races of the random outer ring and selected inner ring are gauged to determine from which of the compartments of the bin of Figure 5 balls should be selected. Because balls from any one of the several ball selections A to D can each be used with either of the inner race classifications 1 to 5, it is seen that an effective multiplying of classifications is achieved. These ball classifications have been provided to compensate for any remaining variation between the selected outer and inner ring races to give an assembled ball bearing having the required operating tolerances.

With the method of this invention, for example, by using five classifications of inner ring race diameters and four ball classifications bearings can be assembled with assurance that radial play will be less than .0004 inch with an overall range of .004 inch on both the inner and outer ring race diameters and a .0008 inch overall range in ball diameters. Thus with only nine different size groupings of the classified parts the radial play in an assembled bearing can be as accurately controlled as if both the inner and outer rings were taken at random, with the same total range in the inner and outer ring race dimensions, and used with twenty different classifications of balls classified in steps of .0002 of an inch range each.

In accordance with the example of the present invention the operator will make fewer mistakes because in picking the right size inner race he has only five size groupings to choose from, and in picking the right size balls there are only four ball size ranges from which to choose. But where the operator would have to pick the same component such as balls from one of twenty different size segregations the possibility of error would be much greater. Furthermore, in practicing the example of the present invention and in classifying the inner races into five different groups there is a size range in each group of .0008 of an inch and the gauging device that accomplishes this classification would not have to be as delicate or precise an instrument as would be required if it had to gauge for classifying in ranges of .0002 of an inch. The balls would have to be gauged and classified into only four groups of .0002 of an inch instead of twenty such ball classifications. The gauging for classification of balls into twenty size ranges of .0002 of an inch over the wide overall size range of .004 of an inch would require an unusual instrument having a very wide range and at the same time very precise gauging ability, and the usual or simple forms of gauging apparatus could therefore not be used.

Numeral 54 of Figure 6 indicates a stop structure shown in section and in more detail in Figure 8. This adjustable stop structure 54 enables the apparatus of Figure 6 to also carry out the gauging of the outer ring race alone. This adjustable stop 54 is carried by the lefthand gauging arm 36. It includes a projection 55 provided to engage a carbide insert 56 carried from the base of the gauging apparatus in fixed position. The projection 55 can be adjusted relative to the arm 36 by rotation of the pin 57 which carries it. This pin 57 is urged upwardly by a pair of cup-shaped washers indicated at 58. Upon rotation of the pin 57 it is moved longitudinally relative to the arm 36 by a ball 59 contacting an inclined surface 60. This adjustable stop 54 is adjusted to position the lefthand gauging arm 36 and orifice controlling surface in the same position as they would be if the contact 38 were engaging an inner ring having a race dimension adjacent the lower tolerance limit. Thus a random selected outer ring can be placed at the righthand side of the gauge and the contact 39 then lowered into contact with its race by actuation of the lever 41. The lefthand arm will be positioned in a reference position by the adjustable stop 54 and the righthand arm will be positioned by the contact 39 engaging the random outer ring race 20.

The instrument 48 associated with the gauging apparatus is calibrated at the righthand side of the tube 50 in terms of inner race classifications 1 to 5, in applying the apparatus of Figure 6 to the present method, and employing the adjustable stop, first a random outer ring is placed at the righthand side of the apparatus and the gauging contacts lowered. The instrument 48 will then indicate from which of the classifications 1 to 5 an inner ring should be selected. The inner ring is taken from that numbered compartment of the bin of Figure 4 and placed at the lefthand side of the apparatus. The gauge contacts 38 and 39 are then lowered into contact with these races. The instrument 48 will then indicate from which of the ball classifications A to D balls should be selected from assembly therewith.

The gauging apparatus of Figure 6 and the adjustable stop illustrated in Figure 8 are more particularly described and are claimed in a co-pending application Serial No. 389,727, filed on even date herewith. Another and materially different apparatus for gauging the dimentional relationship between the races of inner and outer ball bearing rings is illustrated and described in my Patent No. 2,687,038, issued August 24, 1954.

Thus it is seen that a method has been provided whereby precision units such as ball bearings can be manufactured, gauged and assembled without involving an extremely high number of classifications of any one part or the utilization of close manufacturing tolerances. With the procedure herein taught and the unique relationship of the classifications of two of the components into a relatively few groups, a multiplying effect of classifications is achieved and the entire process is simplified materially. One component is gauged to determine from which of previously classified groups of another component a mating component should be selected. These components are gauged together to determine their dimensional relationship and to determine from which selection of still another component a component should be selected for assembly therewith in a finished unit.

While the application of the method herein described constitutes a preferred application thereof, it is to be understood that the invention is not limited to this precise utilization or to the particular apparatuses illustrated for carrying it out and that changes may be made in the present invention without departing from the scope of the invention which is defined in the appended claims; what is claimed is:

1. The method of assembling a unit comprising a plurality of cooperating parts having cooperating dimensions from groups of each of the parts comprising the steps of classifying the parts in a first of the groups into several dimension classification ranges, classifying the parts in a second of the groups into several dimension classification ranges, taking a part at random from a third of the part groups, gauging the cooperating dimension of the random taken part, selecting a part from a classification range of the first group as determined by the gauging of the random taken part, gauging the dimensional relationship between the cooperating dimensions of the part selected from the first group and the random taken part, selecting a part from the particular classification range of the second group of parts as determined by the gauged dimensional relationship, and assembling the random taken part and the selected parts.

2. The method of assembling a unit comprising a plurality of cooperating parts, from groups of each of the parts, comprising the steps of classifying a group of a first of the parts into several equal classification steps, taking a third of the parts at random from its group, gauging the random taken third part to determine the classification step from which a mating first part should be selected, selecting a first part as called for by the gauging of the random taken part so that the random taken part cooperates with the selected first part with a possible variation from a nominal relationship which is within the range of a first part classification step, classifying a group of a second of the parts into several equal classification steps allowing selective compensation for variations in the relationship between the first and third parts as large as the range of one first part classification step and to give the desired part relationships, gauging the selected first and random taken third parts together to determine the second part classification step from which a second part should be selected for assembly therewith, selecting the second part from that determined step, and assembling the random taken third part with the selected first and second parts.

3. The method of assembling an antifriction bearing comprising cooperating bearing components from groups of each of these components, comprising the steps of classifying a group of a first of said components into several different size range classifications, classifying a group of a second of said components into several size range classifications, taking a third of the components at random, gauging the random taken third component to determine which of several size ranges its dimension is within, selecting a first component from that classification range as determined by the dimension of the particular third component gauged, gauging directly the relationship between the random taken third component and selected first component to determine from which of the second component classification ranges a second component should be selected for assembly therewith, selecting a second component from that classification range and assembling the random taken third component and the selected first and second components.

4. A method for assembling a unit comprising first and second parts and intermediate parts cooperating between the first and second parts from groups of each of these parts comprising classifying the first parts into several dimension classification ranges, taking a second part at random, gauging the second part, selecting a first part from that one of the first part classification ranges giving the closest to a desired relationship in accordance with the second part gauging, classifying the intermediate parts into several dimension classification ranges so related to the first part classification as to allow selective compensation for variations in the actual relationship between the random taken second part and selected first part within a first part classification range, gauging the actual relationship between the random taken second part and the selected first part, selecting intermediate parts from that classification range as determined by the actual relationship gauged to give the desired relationship between the parts, and assembling the random taken second part and the selected first and intermediate parts.

5. The method of assembling an antifriction bearing comprising an outer part, an inner part and intermediate antifriction elements from groups of each of these components comprising the steps of classifying the inner parts into a series of size classification ranges, classifying the antifriction elements into a series of size classification ranges, taking an outer part at random, gauging the outer part, selecting an inner part from one of the classification ranges as determined by the outer part gauging, gauging the dimensional relationship between the random taken outer part and the selected inner part, selecting antifriction elements from one of the classification ranges as determined by the dimensional relationship between the random taken outer part and the selected inner part, and assembling the random outer part, the selected inner part and the selected antifriction elements.

6. The method of assembling an antifriction bearing having as components a first part, a second part and intermediate antifriction means from groups of each of these components comprising the steps of classifying the first parts into several size range classifications, classifying the antifriction means into several size range classifications, gauging a random taken second part which has a dimension within the second part tolerance range, selecting a first part from that classification range having the closest to a desired relationship with the particular second part gauged, gauging the direct relationship between the random taken second part and the selected first part to determine from which of the antifriction means classification ranges antifriction means should be selected for assembly therewith to give the desired bearing operating tolerances, selecting antifriction means from that classification and assembling the random second part, the selected first part and the selected antifriction means.

7. The method of assembling a unit comprising a plurality of cooperating parts having cooperating dimensions from groups of each of the parts comprising the steps of classifying the parts in a first of the groups into several classification ranges, the cumulative ranges spanning the tolerance range of the first part, taking a part at random from a third of the groups, gauging the random taken part, selecting a part from that first part classification range as determined by the gauging of the random taken part, whereby the maximum variation from a desired relationship therebetween will be within one first part classification range, selecting parts in a second part group into classification ranges as necessary to allow selective compensation for the possible remaining variation of the first and third part relationship, the number of classification ranges being determined by the range of a first part classification range and the critical assembly tolerances, gauging the dimensional relationship between the random taken part and the selected first part by directly gauging the one against the other, selecting a part from that second part classification range as determined by the dimensional relationship between the random taken part and the selected first part to give the desired assembly relationships, and assembling the random taken part and the selected first and third parts.

8. In the assembly of an antifriction bearing including inner and outer races and antifriction balls from groups of each of the components the steps comprising, gauging and classifying one of the races into a series of diameter classifications, gaging and classifying the balls into a series of diameter classifications, taking one of the other races at random, gaging the diameter of the random taken race, selecting a cooperating race from that one of its classifications as determined by the gaged diameter of the random taken race, then gaging the relative diameters of the inner and outer races, and selecting balls from that classification as determined by the relative race diameters.

9. In the assembly an an antifriction bearing including inner and outer races and antifriction balls from groups of each of the components the steps comprising, gaging and classifying the inner races into a series of diameter classifications, gaging and classifying the balls into a series of diameter classifications, taking one of the outer races at random, gaging the diameter of the random taken outer race, selecting an inner race from that one of its classifications as determined by the diameter of the outer race, whereby the relationship therebetween can differ by no more than the possible variation within an inner race classification, then gaging the relative diameters of the random taken outer race and selected inner race, and selecting balls for assembly therewith from the classification as determined by the relative race diameters, whereby the remaining possible variation is compensated for to bring the assembly within the required operating tolerances.

References Cited in the file of this patent

UNITED STATES PATENTS

| | | |
|---|---|---|
| 2,431,087 | Snubber | Nov. 18, 1947 |
| 2,570,485 | Rieber | Oct. 9, 1951 |
| 2,592,157 | Kendall | Apr. 8, 1952 |
| 2,636,379 | Van Dorn | Apr. 28, 1953 |
| 2,651,412 | Aller | Sept. 8, 1953 |